Dec. 14, 1954  C. W. CHILLSON ET AL  2,696,888
PROPELLER HAVING VARIABLE RATIO TRANSMISSION
FOR CHANGING ITS PITCH

Filed May 26, 1951  3 Sheets-Sheet 1

INVENTORS
CHARLES W. CHILLSON
JOSEPH M. MERGEN
BY
Godfrey B. Spein
ATTORNEY

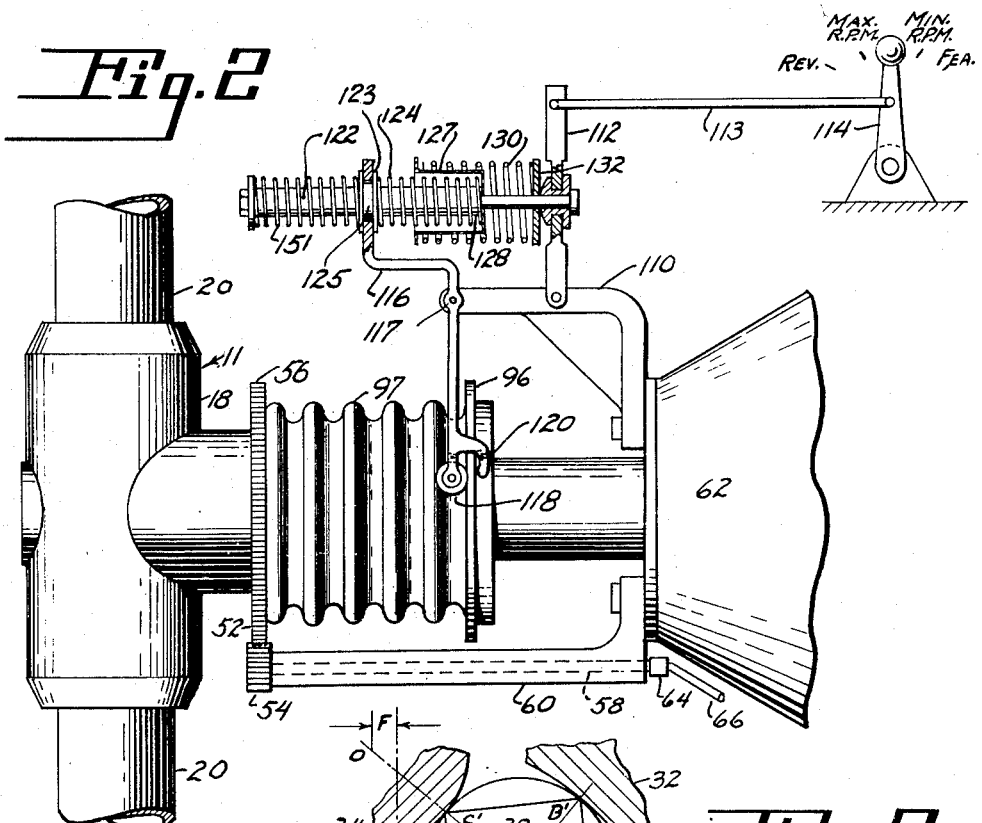
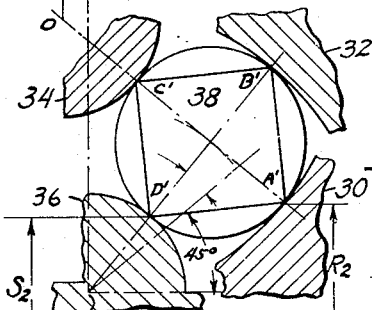
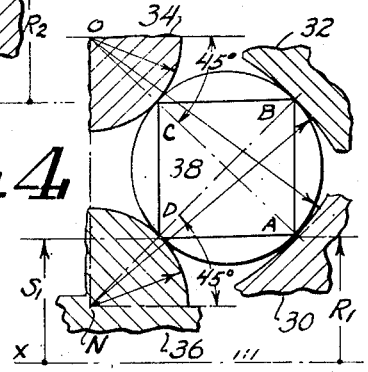
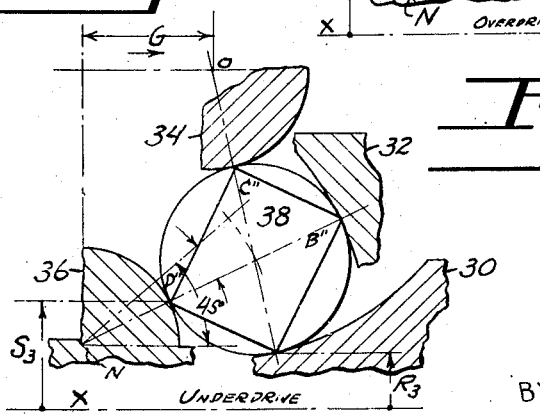

Dec. 14, 1954   C. W. CHILLSON ET AL   2,696,888
PROPELLER HAVING VARIABLE RATIO TRANSMISSION
FOR CHANGING ITS PITCH
Filed May 26, 1951   3 Sheets-Sheet 3

INVENTORS
CHARLES W. CHILLSON
JOSEPH M. MERGEN
BY Godfrey B. Spein
ATTORNEY

United States Patent Office 2,696,888
Patented Dec. 14, 1954

2,696,888

PROPELLER HAVING VARIABLE RATIO TRANSMISSION FOR CHANGING ITS PITCH

Charles W. Chillson, Caldwell, and Joseph M. Mergen, Verona, N. J., assignors to Curtiss-Wright Corporation, a corporation of Delaware Application May 26, 1951, Serial No. 228,444

22 Claims. (Cl. 170—160.18)

This invention relates to transmissions where the ratio between a driving and driven member is continuously variable between the limiting values of ratio for which the mechanism may be designed. The invention further relates to variable ratio power transmission devices which may be self-governing to maintain a constant speed of one of the principle members.

The transmission and other apparatus of this invention are useable in a large variety of environments but a particular environment—one which has been chosen for the illustration of certain embodiments of the invention—is in the field of aeronautical variable pitch propellers. The propeller utilization is not, however, intended to be limiting.

The transmission of this invention is in the class of apparatus in which balls are confined between a plurality of races, with which the balls are in continuous rolling engagement, and against which they are forced to enable frictional driving. Means are provided to shift the race elements with respect to one another and the balls to effect drive ratio changes between certain of the races. It is appreciated that a number of transmissions of this general description have been evolved heretofore but in the present invention, many of the disadvantages of the prior devices have been overcome to enable the construction of an apparatus whose operating effectiveness is great, whose simplicity of construction is noteworthy and whose dependability is assured by hewing to machine design principles which have been proved successful and dependable through long usage. Further, in the present invention, the operation of the transmission involves only rolling contacts of the ball elements with respect to the races and driving and driven members, minimizing the amount of wear which might be expected in the system. Furthermore, control of the transmission and the loading of the ball and race elements with respect to each other have been worked out to yield a friction transmission of high load capacity and great flexibility in operation. Governing features may be embodied inherently in this transmission as will appear later, to enable the control of speed variations without recourse to extraneous and complex control systems.

More particularly, the invention consists in the provision of four concentric race elements, the faces of the races defining an annular cavity within which are disposed a plurality of balls, the balls being akin to usual steel balls utilized in ball bearings. The four races are elastically loaded against the balls to a degree necessary to produce rolling friction between the balls and each race to enable driving effort to be transmitted between each ball and race. The four race faces are so shaped in profile that when the races are moved relative to one another, the balls shift in position with respect to the races to afford a change in drive ratio between the race assemblage. In the general case, at least one of the races is a driving member, at least one is a driven member and at least one is a reaction member. The fourth race may be paired with either the driving, driven or reaction members. As the detailed description proceeds, it should be apparent that these different pairings will be possible although for convenience in the drawings and description, two of the races have been used as reaction members of the transmission while one race comprises a driving member and the other a driven member.

By appropriate arrangement of the profile shapes of the several races, diagonally opposed races comprise pairs which may be shifted axially with respect to the other pair of diagonally opposed races to afford change in ratio of the transmission. The race profiles are further so shaped that upon ratio change, the balls shift inwardly and outwardly from the axis of rotation of the transmission and are spun by the races about their own centers. Since the balls as a group may rotate about the shaft axis at relatively high speed, they tend to shift outwardly under the influence of centrifugal force in the same manner as the fly balls of a governor. By elastically biasing the appropriate race pair, the centrifugal effect is balanced tending to hold the balls toward an inward position. Should speed variations occur, axial shift of the race pairs is effected by the balls, changing the ratio of the transmission, and by a suitable mechanical arrangement, this ratio change may be utilized to adjust part of the system to restore the entire mechanism to a desired speed wherein the centrifugal effect of the balls is balanced by an elastic governor spring.

When the invention is applied to a mechanism of the character of a controllable pitch propeller, additional apparatus may be utilized to afford propeller blade pitch limits and to provide additional functions such as reverse pitch of the propeller blades and feathering of the propeller blades, this apparatus being embodied in the elastic control mechanism of the ball transmission.

The particular nature of the invention may be better understood by referring to the annexed drawings and the following detailed description wherein similar reference characters designate similar parts and wherein Fig. 1 is a longitudinal section through a governing ball transmission of the invention as applied to a controllable pitch propeller;

Fig. 2 is an overall side elevation of the mechanism of Fig. 1 also incorporating control features for the transmission;

Figs. 3, 4 and 5 are diagrams of the ball race and ball elements of the transmission of Fig. 1 showing the parts in different positions of adjustment for different drive ratios.

Figure 1:
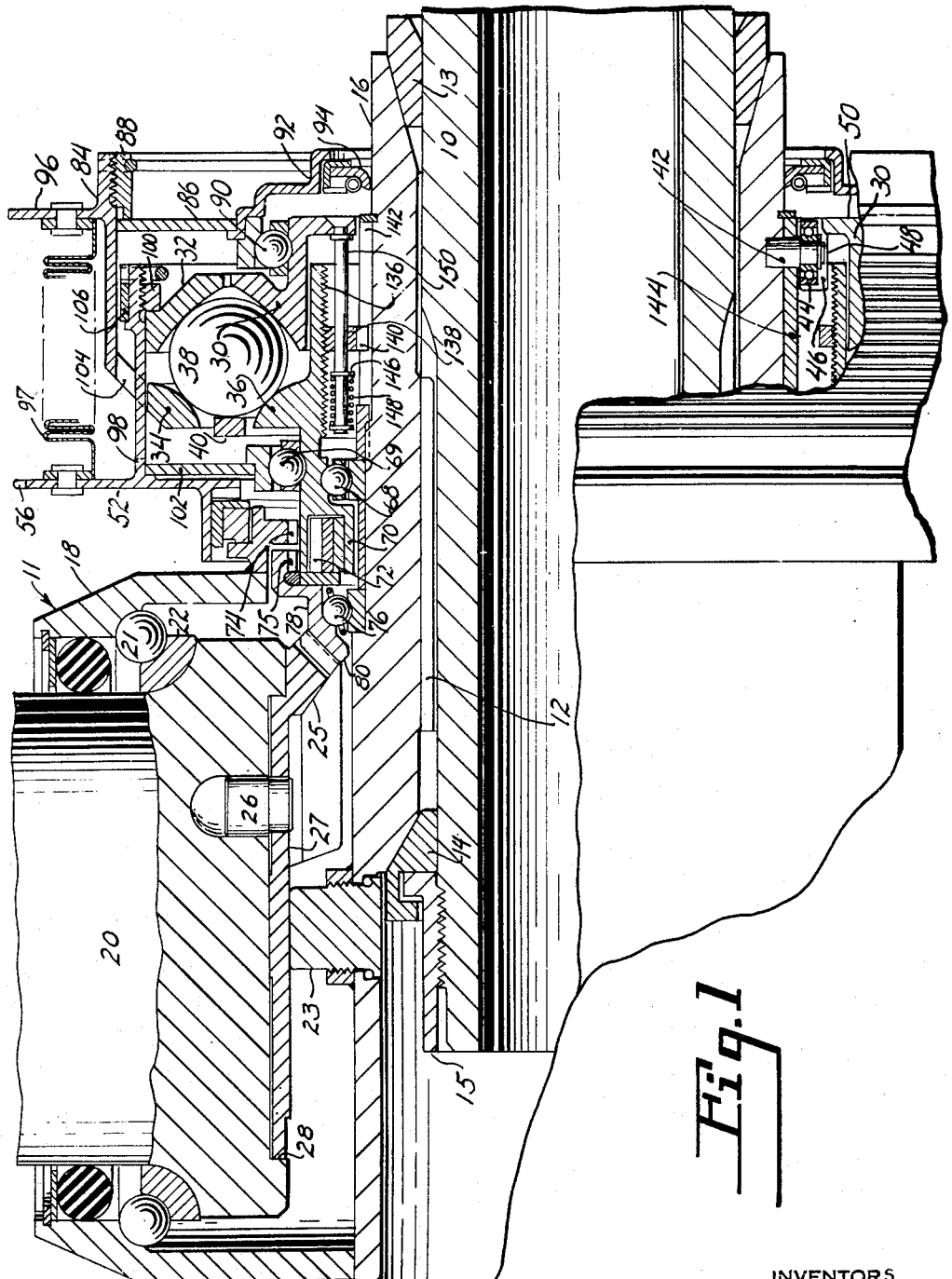

First, the specific operation of the ball transmission will be described in connection with Figs. 3, 4 and 5 describing also a generalization of the various forms which the elements of the ball transmission may take to produce an effective result. Then, the mechanism of the transmission in connection with a propeller and its controls according to Figs. 1 and 2 will be detailed. Thereafter, the alternative arrangement of Fig. 6 will be covered.

In Figs. 3, 4 and 5, the axis of rotation of the transmission is shown at X. Four annular races, 30, 32, 34 and 36 are arranged coaxially on the axis X. The races 32 and 36 have a sectional profile consisting of arcs struck from a center N, while the races 30 and 34 have arcuate profiles struck from a center O. It may be assumed for the time being that the races 32 and 36 are relatively rotatable but are constrained to a fixed axial spacing relative to each other. In similar fashion, races 30 and 34 have constant axial spacing but are relatively rotatable. Contacting all four of the race surfaces are a series of balls 38 which roll on the several race surfaces. In the particular arrangement shown (referring to Fig. 4) when the transmission ratio is 1:1 the centers of the balls 38 lie on construction lines which make angles of 45° with the rotation axis X and which respectively pass through the centers N and O. These angles while shown in Fig. 4 are not critical—many other geometrical configurations are possible.

In Fig. 4, the balls contact the races 30, 32, 34 and 36 at points A, B, C, and D. We may assume for the moment that the races 32 and 34 are fixed from rotation about the axis X, that the race 30 rotates about the axis X as a driving member, and that race 36 may rotate about the axis X as a driven member. As the race 30 rotates, the point A, instantaneously, will have the same linear velocity on the race and on the ball, swinging the line AB about B as a fixed center. Since the point C is also fixed, the point D will be constrained to rotate or to move at the same linear velocity as the point A. Point A is spaced at a distance R from the axis X and point D is spaced a distance S from the axis X. In Fig. 4, R1 and S1 are equal by construction whereby the race 36 is forced to rotate around the axis X at the same angular velocity as the race 30.

In Fig. 3, the races 30 and 34 have been shifted leftwardly with respect to the races 32 and 36 by a distance F. By the curved contours of the race faces, the radius R2 becomes greater than the radius S2. With the points B' and C' fixed as before, the points A' and D' will have the same instantaneous speed induced by rotation of the race 30. Since R2 is greater than S2, the angular velocity of the race 36 must necessarily be greater than the angular velocity of the race 30, thereby producing an overdrive on the race 36 or a speed in excess of the speed of the race 30. In this condition, the rectangle A'B'C'D' is tilted to the left, and the balls 38 are displaced outwardly and leftwardly, contacting different portions of the several races than were contacted in Fig. 4.

In Fig. 5, the races 30 and 34 have jointly been displaced to the right by a distance G from the races 32 and 36. This race movement moves the balls rightwardly and inwardly toward the rotation axis X and establishes ball contacts with the races at the points A'', B'', C'', and D''. The point A'' has moved closer to the axis X and is displaced at a distance R3 therefrom and at the same time, the point D'' engages the race 36 at a distance S3 from the rotation axis X, R3 being less than S3. The points B'' and C'', as before, are instantaneosuly fixed. Therefore, while the points A'' and D'' have the same instantaneous linear velocity induced by rotation of the race 30, the angular velocity of the race 36 will be less than that of the race 30, since the point D'' is further removed from the axis of rotation X than the point A''. This arrangement produces an underdrive of the race 36 with respect to the race 30 or, in other words, a speed reduction.

Any shifting of the races 30 and 34 to right or left of the position shown in Fig. 4 will therefore produce either overdrive or underdrive of the driven race 36, the driving ratio being a function of the amount of axial shift of the races within the limits of movement of the system. In all cases, the balls roll truly on the respective races with a minimum of scrubbing and with no sliding. The two fixed races 32 and 34 stabilize the balls from swivelling about one or another point of contact of the balls with the races. In any fixed positioning of the races with respect to each other, the lines AB and CD may be thought of as planet pinions engaging external gears and internal gears after the fashion of a compound planetary gear set. However, by the use of balls and races in the manner described, infinitely small variations in drive ratio may be obtained in the system. Provided the races 30, 34 and 32, 36 are loaded toward one another with sufficient force, torsional loading of the transmission may be carried to a high level. Furthermore, the force necessary for shifting ratio in the gear set—merely the axial movement of the race pairs with respect to each other—is small, and in effecting such shift, the balls 38 roll freely to their new positions and spin on their newly established axes while rolling on the races.

Figs. 3, 4 and 5 utilize race faces of particular arcuate form which produce a substantial ratio change for small axial shifts of the race pairs and also by the fixed axial distances between the race pairs, simple arrangements for loading the races against the balls may be utilized. However, the faces of the four races may take a large number of different forms while still allowing for ratio change in the transmission by movement of the several races with respect to each other. For instance, one or more of the race faces might be conical in shape or one or more of them might be more sharply curved or more flatly curved than in the arrangement shown. Furthermore, any two of the races could be either driving, driven or reaction elements with the remaining two races serving the two other functions of driving, driven or reaction elements. In all arrangements, the balls are free to roll upon all four of the races and are constrained in the proper positions in the annular space between the races by their contact with the races. Preferably, as will be pointed out in specific applications of the transmission, ball retainers are utilized to hold the several balls in annularly spaced relation with freedom to move along the rotation axis and radially with respect thereto.

In Figs. 1 and 2, 10 represents a propeller shaft or power shaft upon which is mounted a propeller 11 through a spline connection 12, centering cones 13 and 14 and an appropriate hub nut 15. The hub 11 includes an inboard cylindrical extension 16 embracing the propeller shaft and a member 18 providing sockets within which propeller blades 20 are rotatably mounted. The blades 20 are carried on thrust bearings 21 for which one race is formed in the hub socket 18, the other race 22 embracing the flanged butt of the blade. The blade is held in a position to preload the bearings 21 by an adjustable stop 23 formed in the forward portion of the sleeve 16. The blade is further provided with a bevel blade gear sector 25 secured for rotation with the blade 20 by a dowel 26, part of which engages the blade and part of which engages a plate 27, forming part of the gear 25, and seated in a recess 28 formed in the butt of the blade. As shown in the drawings, the adjusting stud 23 bears upon the gear plate 27.

As is well known in the propeller art, means are normally provided in a propeller to change the pitch of the blades thereof during operation. For this purpose, a power means and a transmission of some sort is required, usually operating in conjunction with a constant speed governor. In general, if the propeller deviates in speed from a desired value, the governing and pitch changing mechanisms alter the pitch of the propeller blades to increase or decrease the load on the prime mover thereby to reestablish propeller rotational speed at the desired level.

Part of the present invention lies in the particular governing and transmission mechanism embodying the principles described in connection with Figs. 3, 4 and 5, by which blade pitch changes may be effected for the above noted purpose. The transmission, shown in the right hand portion of Fig. 1, comprises the plurality of races 30, 32, 34 and 36, the races all having profiled faces facing one another to define an annular cavity within which the plurality of balls 38 are disposed. The balls are held in appropriately spaced relation around the propeller shaft by a retainer 40 which allows the balls to move radially inwardly and outwardly with respect to the propeller axis but the retainer 40 does not have any part in the driving function of the transmission.

The race 30 is capable of limited axial movement along the propeller shaft but is secured for rotation with the propeller shaft by means of a dowel 42 engaging the propeller sleeve 16, having a bearing 44 at its outer end which engages a notch 46 formed in bosses 48 integral with a flanged portion 50 of the race 30. The races 32 and 34, though axially movable with respect to each other, are non-rotating, normally, being secured to a plate 52 which is normally anchored from rotation by a pinion 54 (Fig. 2) engaging gear teeth 56 formed on the periphery of the plate 52, the pinion 54 being mounted on a shaft 58 journalled in a bracket 60 mounted on the engine nose 62. The shaft 58 enters a no-back brake 64 of any desired character while a control shaft 66, flexible if desired, may lead to a mechanical manual control. A no-back brake of suitable type is shown in Mergen et al. Patent No. 2,566,705 issued September 4, 1951. Such a device permits drive in one direction from shaft 66 to shaft 58 but locks the shaft 58 against rotation, if there is a torque imposed on it from the propeller mechanism unless the control shaft 66 is rotated intentionally to allow rotation of the shaft 58.

The race 36 in Fig. 1 is piloted on a bearing 68 and has a bearing 69 around it. The race 36 also carries a leftward extension comprising a journal 70 eccentric to the axis of a propeller. Upon this eccentric 70 is freely journalled a pinion 72. A ring gear 74 is secured to the hub 11, and is engaged with the teeth of the pinion 72 at another portion of the peripheries of the respective gears than is shown in Fig. 1. The gear 74 is coaxial with the propeller. Side by side with the gear 74 is another gear 75 which also meshes with the teeth of the pinion 72, this gear 75 being borne coaxial with the propeller on a bearing 76. The gear 75 carries a forward extension 78 with which a bevel master gear 80 is integral, the gear 80 being meshed with the blade bevel gear sectors 25. Rotation of the ring gear 75 with respect to the propeller hub will rotate the blades for pitch change through the meshing of the bevel gear elements 80 and 25.

The gears 74 and 75 while generally similar in pitch and diameter have a differential number of teeth. For instance, the gear 74 may have 100 teeth and the gear 75, 101 teeth. As the eccentric 70 rotates with respect to the hub, the pinion 72 turns on the eccentric, controlled in its rotation by engagement with the gear 74, the pinion 72, also engaging the gear 75, forces gear 75 to rotate with respect to the gear 74 on account of the difference in the numbers of teeth between the gears 74 and 75. This arrangement provides a gear reduction, for the tooth numbers named, of 100 to 1. That is, if the eccentric rotates one revolution with respect to the propeller hub and gear 74, the gear 75 will be rotated 1/100 of a revolution with respect to the gear 74 and propeller hub in in the same direction as the rotation of the eccentric relative to the hub.

The particular arrangement and mode of operation of the ball transmission elements 30—38 will now be amplified as they relate to propeller pitch control. The ball races 30 and 34, lying diagonally opposite, are constrained to axial movement with one another by virtue of a housing 84 for the race 34, a stiff spring washer 86 secured to the housing 84 by an adjustable internal nut 88, and a thrust bearing 90 fitted to the inner edge of the washer 86 and to a ball groove formed in a portion of the race 30. By this construction, the races 30 and 34 may rotate relative to one another but are constrained to axial movement with one another. Furthermore, the spring washer 86 preloads the races 30 and 34 into firm driving engagement with the balls 30 rolling therebetween. The mounting for the outer race of the thrust bearing 90 is continued inwardly toward the propeller shaft sleeve 16, as at 92 and carries an elastic seal 94 engaging the propeller shaft sleeve. Also, the housing 84 associated with the bearing race 34 carries an outward flange 96 by which the assembly of the races 30 and 34 may be moved axially as will be described. The plate 52 is coupled to the flange 96 by a flexible boot 97 for lubricant retention and protection.

The races 36 and 32 are constrained to move axially with one another. The plate 52 is an extension of a housing 98 to which the race 32 is fitted and secured by an internal nut 100. The other end of the housing 98 carries a stiff spring washer 102 whose inner edge is fitted to the outer race of the thrust bearing 69 assembled on part of the race 36. The nut 100 provides means to load the races 32 and 36 into firm engagement with the balls 38, through the spring washer 102, while permitting relative rotation of the race elements through the bearing 69. The housing 98 comprises a plurality of fingers which pass through apertures 104 in the housing 84 whereby the races 32 and 34 are constrained against relative rotation while being free to move axially with respect to one another. The fingers of the housing 98 at their rightward ends are embraced by a ring 106 to prevent outward displacement of the fingers when the nut 100 is engaged with them and to hold the housing 98 in firm piloting relation with the race 32.

Thus it will be seen that the races 30 and 34 while relatively rotatable move axially with one another. In similar fashion the races 32 and 36 are constrained against axial movement but are free to rotate with respect to each other.

As was described in connection with Figs. 3–5, the faces of the races 30–36 are curved, and ratio changes between the driving race 30 and the driven race 36 are afforded by axial shifting of the races 30, 34 with respect to the races 32, 36. The race 30 driven by the propeller, rolls the balls 38 around the contacts of the balls with the non-rotating races 32 and 34. Thus, where the balls 38 contact the race 36, the race 36 is constrained to rotate at the same, a greater, or a lesser speed with respect to the speed of rotation of the propeller shaft. If the adjustment of the races is such that the race 36 rotates at uniform speed with the race 30, the race 36 will not rotate relative to the propeller shaft and no pitch change will occur. If the axial position relationship of the races is such that the race 36 rotates slower or faster than the race 30, decreasing or increasing pitch change respectively will be imparted to the propeller blades through the reduction gears 72, 74 and 75.

Since during operation the race 30 causes the balls 38 to rotate bodily around the propeller shaft, at approximately half the speed of propeller rotation, these balls tend to move outwardly under the influence of centrifugal force and thus tend to spread the races 32 and 34. The race 32 is fixed against axial movement by the bearings 68 and 69. Thus, the balls would tend to bear on the race 34 and to shift it leftwardly along with the race 30 and if such shift were permitted, a ratio change in the transmission enforces an increase in blade pitch. The race 34 along with the race 30 is constrained against this leftward movement by a resilient governor arrangement shown in Fig. 2.

The engine nose 62 carries a bracket 110 upon which is pivoted a control arm 112 connected by a rod 113 to a control lever 114. A rocker 116 is pivoted to the bracket 110 at 117, the lower portion of the rocker being bifurcated and having rollers 118 at its ends engaging the forward face of the axially movable flange 96 on the transmission. The lower end of the rocker 116 also carries fingers 120 engageable with the rear face of the flange 96 for a purpose which will become apparent later. The upper end of the rocker 116 embraces a rod 122 on which is disposed a governor speeder spring 124 which bears at its left end on a washer 123 which is stopped by a flange 125 integral with the rod 122, precompressing the spring 124 to the extent necessary for the minimum governed engine speed. The spring abuts at its rightward end against the end of a flanged cup 127 piloted on the right hand end of the rod 122 and limited in its leftward movement along the rod by an enlarged diameter portion 128 of the rod. The rod at its rightward end is engaged with the arm 112. The cup 127 is urged to its leftwardmost position by a strong spring 130 engaging the cup flange at its leftward end and engaging a washer 132 at its rightward end, the washer abutting against a portion of the arm 112.

When the lever 114 lies between the positions "MAX RPM" and "MIN RPM" the speeder spring 124 exerts a leftward force on the rocker 116 which in turn exerts a rightward force, through the rollers 118 on the transmission flange 96. During rotation of the propeller and assuming the propeller to be gathering rotational speed, the flange 96 is urged to the right thereby urging the transmission (Fig. 1) to an underdrive ratio wherein the pitch of the propeller will decrease enabling the propeller to speed up as it is driven by the engine. As the propeller gains speed, the balls 38 in the transmission will gradually want to move outwardly under the influence of centrifugal force, acting on the race 34 and pushing it leftwardly against the governor speeder spring force. As this outward movement occurs, the transmission ratio increases from underdrive toward 1:1 ratio and will balance out at 1:1 ratio when the centrifugal force from the balls is equivalent to the compression force of the speeder spring. Then, the propeller is on-speed.

Should the propeller be operating at an overspeed condition, either as a result of purposeful adjustment of the control 144 to a lower speed setting or of transient overspeed tendencies resulting from aerodynamic factors affecting the propeller, the balls 38 in the transmission will exert a larger centrifugal force than that which is counteracted by the compressed speeder spring, shifting the ball race 34 leftwardly or to the position shown in Fig. 3, to an overdrive position wherein increase in blade pitch will occur. The increased blade pitch will slow down the propeller and the transmission will be restored to a 1:1 ratio when the propeller is on-speed and when the centrifugal force of the balls 38 balances the force of the speeder spring. Accordingly, the elements of the transmission including the balls 38 and the races 30—36 in conjunction with the adjustable speeder spring 124 provide a self-governing pitch changing mechanism for the propeller blade.

The propeller shown and described herein may also be adjusted to a normal low pitch limit and to reverse pitch settings for aerodynamic braking of an aircraft and can be returned from reverse pitch to a normal pitch setting. If the control 114 be moved to the "MAX RPM" position, propeller blade pitch will decrease and concurrently, the races 30 and 34 will be moved leftwardly while the races 30 and 36 rotate relative to each other. Within the hub of the race 36 is formed a continuous screw thread 136, engaged by a nut 138 keyed at 140 to rotate with the propeller hub, the key 140 engaging a slot 142 in a sleeve 144 rotatable with the propeller hub. The nut 138 in effect becomes a pitch indicator and as minimum pitch comes into being, the nut 138 moves leftwardly along the threads 136 until it reaches a washer 146 backed up by a precompressed spring 148, the spring and washer being mounted upon a rod 150 secured to the race 30. When minimum pitch is reached, the nut 138 can travel no farther to the left upon the washer 146 and thereby, the race 30 is drawn toward the left to bring the transmission ratio to 1:1 despite the force exerted by the speeder spring 124. This, then, will prevent the blade pitch from going below the minimum blade angle. Now, if reverse pitch is desired, the control 114 is moved still farther to the left whereupon the heavy spring 130 of the governor spring assembly forces the rod 122 to the left and enforces a still further pitch decrease of the propeller by forcing rightward movement of the flange 96 and of the transmission ball races 30 and 34. The force of the spring 130 is sufficient to overcome the spring 148 inside the transmission. Thus, continued pitch decreasing will be called for and this will continue until the pitch indicator nut 138 within the transmission has bottomed the spring 148 to its solid height. Thereupon, the solid abutment of the elements 138 and 148 will prevent further pitch decrease and these are so arranged that when the spring 148 reaches its solid height a predeterminate reverse pitch setting of a desired negative angle will have been reached. The solid connection between the nut 138 and the race 30 will enforce readjustment of the transmission to 1:1 ratio regardless of the force exerted by the spring 130 so that the propeller will continue to operate in the reverse pitch setting so long as the control 114 is set in the reverse pitch position.

When return from reverse is desired, the control 114 is readjusted to a desired RPM setting. This relieves the extra pressure imposed by the spring 130 and allows the balls 38 to move outwardly since they are rotating at high speed, and since the races are urged apart by the springs 148 urging the transmission to an overdrive ratio to increase blade pitch. Blade pitch will increase until the normal action of the speeder spring 124 balances the centrifugal force exerted by the balls 138 to stop pitch change and to bring the propeller on-speed as was previously described.

If it is desired to feather the propeller, the control 114 is moved to its extreme rightward position. This relieves the speeder spring 124 of any duty. A light spring 151 arranged around the rod 122 at its leftward end, and engaging the rocker 116, will now urge the rocker in a counter-clockwise position whereby the fingers 120 will urge the flange 96 to the left. This moves the races 30 and 34 to the left toward an over-drive position to increase blade pitch and blade pitch will increase substantially to the feathering pitch position while there is still rotation of the propeller shaft. Presuming the engine driving the propeller is dead, the propeller will cease rotation as its pitch is increased to approximately 90°, the last few degrees of pitch increase being slow due to the slow rotation of the propeller shaft. Eventually, rotation of the propeller will cease and likewise, increase pitch change will cease. Thus, there is no need for a high pitch limit stop within the pitch changing mechanism.

When it is desired to return to a normal pitch setting from the feathering position of the propeller blades, the control 114 is moved leftwardly again bringing the speeder spring 124 into action and exerting a rightward force on the flange 96, urging the races 30 and 34 rightwardly to reduce pitch. Unless rotation is imparted to the transmission, no ratio change and no pitch decrease will take place since the propeller is stopped. So we provide means for rotating the housing 98 which carries the normally stationary races 32 and 34. This rotating means comprises a manually turnable cable 66 previously described, driving shaft 58 and pinion 54, the pinion driving the gear 56 from a part of the normally stationary housing 98. A moderate amount of rotation of the housing 98 will initiate a small amount of pitch decrease until enough of the blade face is brought into engagement with the relative wind through which the aircraft is flying, to initiate propeller rotation. As soon as the propeller starts to rotate, the transmission, set at a pitch decrease adjustment, will continue to decrease propeller blade pitch, the propeller will increase in rotational speed, and the propeller will finally reach on-speed in conformance with the setting of the RPM control 114.

Figure 6:
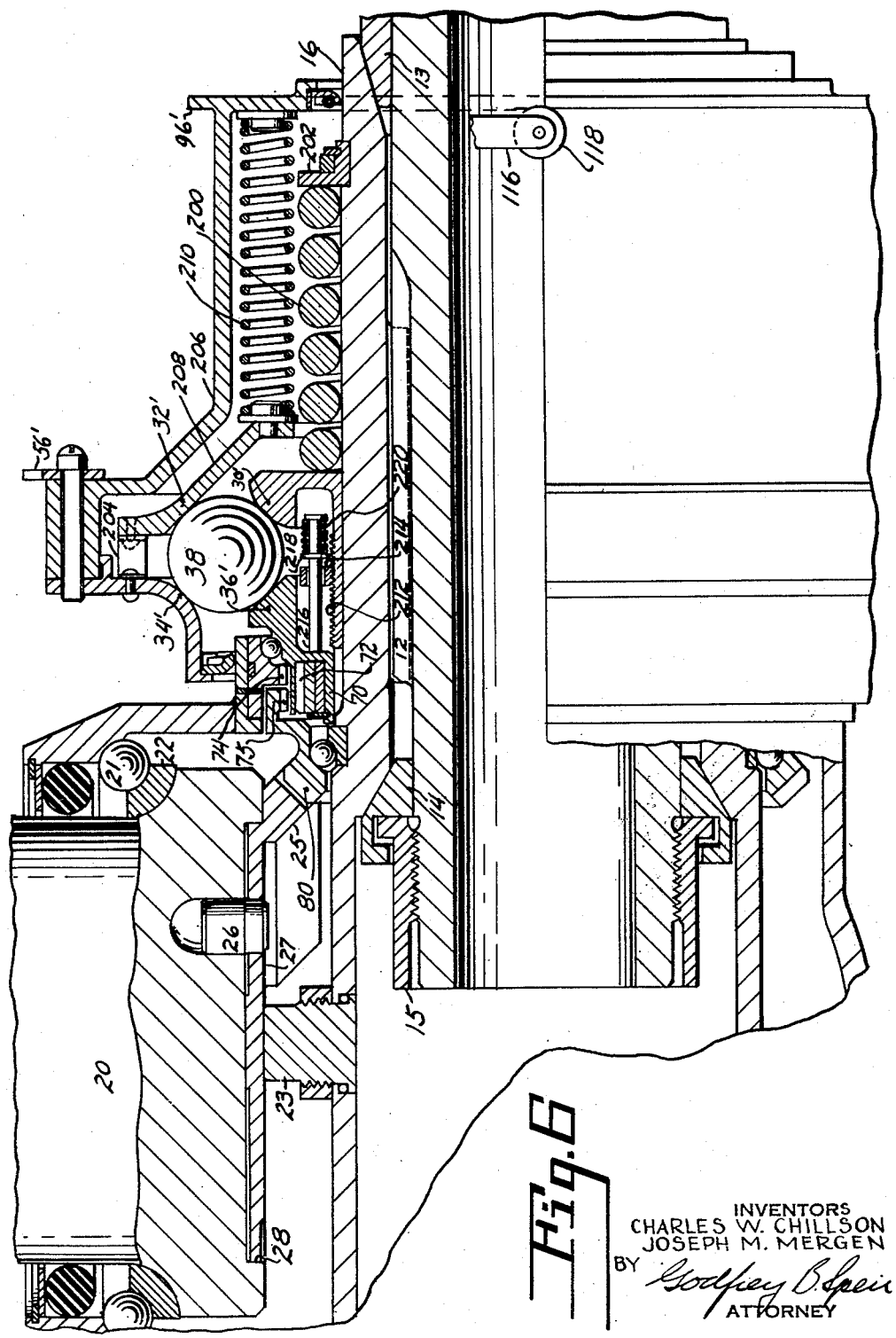
Fig. 6 is a longitudinal section of an alternative form of variable ratio ball transmission applied to a controllable pitch propeller.

In Fig. 6, an alternative arrangement of variable ratio transmission is shown, the unit being applied, as in the first embodiment, to a variable pitch propeller. The propeller components and reduction gear (72, 74, 75) between the transmission output member and the propeller blades are the same as in the first embodiment. Also, the control arrangements disclosed in Fig. 2 may be applied, these being connected with the flange 96' and the unfeathering gear teeth 56'.

The transmission comprises essentially the four annular races 30', 32', 34' and 36' and the balls 38. The driven race 36' may rotate with or with respect to the propeller hub, and the race face is conical in form. The driving race 30' has an arcuate face and is loaded leftwardly, toward the race 34', by a stiff spring 200 surrounding the propeller hub sleeve 16, the spring abutting at its right end on an annular shoulder 202 secured to the hub sleeve. The spring is secured against rotation to the sleeve and race 30' and serves to drive the race for unitary rotation with the hub. The normally non-rotating races 32' and 34' are secured against relative rotation by yielding straps 204, and both float axially to assume proper positions for ball engagement in accordance with the radial and axial positions of the balls 38. The races 34' and 32' are respectively furnished with rightward annular extensions 206 and 208 providing abutments for the ends of a plurality of loading springs 210 disposed around the spring 200, whereby the races 34' and 32' are urged into firm contact with the balls 38. The extension 206 carries the unreversing gear 56' (engageable with the pinion 54 of Fig. 2) and also a flange 96' engageable by the rollers 118 acted upon by the governor speeder spring 124 and associated control mechanism (Fig. 2).

In the operation of the transmission, the races 36' and 32' remain in the same axial location, and their conical faces constrain the balls 38 to movement during ratio change in a conical path. During in and out shift of the balls, the races 30' and 34' move axially due to their curved faces, and change the drive ratio between the races 30' and 36' between underdrive, 1:1, and overdrive. For all the various positions of the race 34', the springs 210 maintain the race in driving engagement with the balls 38, the reactive force of the springs 210 likewise loading the race 32' against the balls. Also, the spring 200 loads the race 30' against the balls for all positions of the race 30' along the shaft. The rates and values of the springs 200 and 210 are chosen substantially to balance one another through the balls 38, whereby the balls will respond to centrifugal effects, exerting a leftward axial force on the race 34' which is balanced or counteracted by the governor speeder spring (124 in Fig. 2).

The Fig. 6 arrangement has an advantage over the Fig. 1 arrangement in that thrust bearings are eliminated between the relatively rotating transmission races. On the other hand, the Fig. 6 arrangement has a disadvantage in that delicate balance is required between the springs 200 and 210 to eliminate residual spring forces which would bias the speed response of the system.

The two embodiments, however, suggest alternative arrangements of practical character, and can serve as a spring-board for the skillful designer in evolving numerous other designs embodying the fundamental principles of the invention.

In Fig. 6, the hub of the race 30' is provided with screw threads 212, on which a nut 214 is threaded. The nut rotates with the race 36' by means of shafts 216 on the race 36' engaging holes in the nut. The nut translates along the thread 212 and its axial position is an index of blade pitch. The shaft 216 carries a normal low pitch limit stop washer 218 which, when engaged by the nut 214, pulls the races 30' and 36' toward one another until 1:1 drive is established whereupon pitch change ceases.

The washer 218 is backed up by a precompressed spring 220, which may be overcome by manipulation of the control 114 (Fig. 2) forcing the races 34' and 30' rightwardly so that the transmission underdrives, pitch decrease continuing to reverse pitch. The reverse pitch limit is reached when the spring 220 reaches solid height and when the transmission is restored to 1:1 ratio from underdrive. Restoration to forward pitch is accomplished by allowing the races 34' and 30' to move leftwardly.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In a transmission mechanism, a first pair of axially spaced coaxial races with their faces lying at an angle to the axis, a second pair of spaced coaxial races coaxial also with the first pair with their faces lying at a different angle to the axis, balls between and contacting all four races, means to preload the races of each pair into firm frictional engagement with said balls, and means to shift said race pairs axially relative to each other to move said balls across the faces of the several races to change the drive ratio between the several races, at least one of said races comprising a rotating driving member, one a rotating driven member and one a non-rotating reaction member, said race faces of respective pairs being curvedly profiled in concentric arcs so as to be substantially equally axially spaced from one another by said balls in all positions of the balls across the faces.

2. In a transmission mechanism, a first pair of axially spaced coaxial races with their faces lying at an angle to the axis, a second pair of spaced coaxial races coaxial also with the first pair with their faces lying at a different angle to the axis, balls between and contacting all four races, means to preload the races of each pair into firm frictional engagement with said balls, and means to shift said race pairs axially relative to each other to move said balls across the faces of the several races to change the drive ratio between the several races, at least one of said races comprising a rotating driving member, one a rotating driven member and one a non-rotating reaction member, the race faces of at least one pair of races, in sectional profile, being concentrically arcuate in form.

3. In a transmission mechanism, a first pair of axially spaced coaxial races with their faces lying at an angle to the axis, a second pair of spaced coaxial races coaxial also with the first pair with their faces lying at a different angle to the axis, balls between and contacting all four races, means to preload the races of each pair into firm frictional engagement with said balls, means to shift said race pairs axially relative to each other to move said balls across the faces of the several races to change the drive ratio between the several races, at least one of said races comprising a rotating driving member, one a rotating driven member and one a non-rotating reaction member, said balls during rotation of the rotatable races tending to move outwardly through the urge of centrifugal force, and means elastically to urge said race pairs toward a relative position to hold said balls from outward shifting.

4. A continuously variable ratio change-speed transmission comprising first and second substantially external conical coaxial races, third and fourth substantially internally conical races coaxial with one another and with the first two races, the race surfaces being disposed relative to one another to define a ball-carrying annular cavity, a plurality of balls in the annular cavity each engaged by all of said races; means to preload the first and third races against said balls, means to preload the second and fourth races against said balls, the second and fourth races being jointly movable axially relative to the first and third; means to anchor the third and fourth races against rotation, means to drive the first race rotationally, and an element driven rotationally by said second race.

5. A continuously variable ratio change-speed transmission comprising a plurality of ball races, one race comprising a driving member, one a driven member and one a reaction member, another of said races being paired with one of the other three, a plurality of balls disposed around and engaging said races and rotatable thereby, said races being relatively axially movable to shift the contact of the balls with the race faces, means to load said races into frictional driving engagement with said balls, and shifting means connected between said driving and driven races to enforce axial shift of said races to positions for 1:1 drive ratio upon relative rotation of the driving and driven races through a determinate number of turns.

6. A continuously variable ratio change-speed transmission having speed governing characteristics, comprising a plurality of ball races, one said race comprising a driving member, one a driven member and one a stationary reaction member, a plurality of balls disposed around and engaging said races and being rotatable relative thereto, said balls being movable radially outwardly under the urge of centrifugal force and affording varying drive ratios from said driving to said driven elements in accordance with their radial position, means to hold said balls in contact with said races for frictional engagement therewith, means elastically urging said races to move said balls inwardly, and means to enforce said balls and races to positions for 1:1 drive ratio after rotation of the driving and driven races relative to each other through a determinate number of turns.

7. A propeller having a hub and variable pitch blades, a driving ball race driven by, rotatable with the hub, and axially movable along the hub, a driven ball race rotatable relative to the hub and drivingly connected to said blades, two normally non-rotating, relatively axially movable races facing the first two races, balls each engaging all said four races, means connected to certain of said races to shift the axial position thereof relative to the other races to alter the drive ratio from the driving to the driven race from 1:1 to underdrive and to overdrive, and means connected to said hub and engageable at times with one of said axially movable races to restore the axial position of said races for 1:1 drive in response to attainment by said blades of a pitch limiting position.

8. A propeller having a hub and variable pitch blades, a driving ball race driven by, rotatable with the hub, and axially movable along the hub, a driven ball race rotatable relative to the hub and drivingly connected to said blades, two normally non-rotating, relatively axially movable races facing the first two races, balls each engaging all said four races, means connected to certain of said races to shift the axial position thereof relative to the other races to alter the drive ratio from the driving to the driven race from 1:1 to underdrive and to overdrive, said balls during rotation with and with respect to said races being urged outwardly under the influence of centrifugal force, and elastic means to urge the races to positions where the balls are held in a certain orbit of rotation against the effects of centrifugal force.

9. A propeller having a hub and variable pitch blades, a driving ball race driven by, rotatable with the hub, and axially movable along the hub, a driven ball race rotatable relative to the hub and drivingly connected to said blades, two normally non-rotating, relatively axially movable races facing the first two races, balls each engaging all said four races, means connected to certain of said races to shift the axial position thereof relative to the other races to alter the drive ratio from the driving to the driven race from 1:1 to underdrive and to overdrive, and means connected to said non-rotating races operable to rotate said normally non-rotating races to effect propeller pitch change when the propeller is not rotating.

10. In a variable ratio ball transmission, four races disposed to define an annular space therebetween, a row of balls in said space each ball engaged by all four of said races, the first and third of said races lying opposite and facing one another, the profiles of said first and third races being arcuate and concentric, the second and fourth of said races lying opposite and facing one another and lying between the first and third races, the profiles of said second and fourth races being arcuate and concentric but about a different center from that relating to the profiles of the first and third races, elastic means connected to the first and third races to urge them into ball engagement, elastic means connecting the second and fourth races and urging them into ball engagement, means to shift the first and third races axially and jointly with respect to the second and fourth races whereby the row of balls is shifted radially inwardly and outwardly, and means mounting at least three of said races for rotation relative to each other.

11. A transmission according to claim 10 including means connected to two adjacent races and holding them against rotation, a driving connection to one of the remaining races, and a driven connection to the other remaining race.

12. A transmission according to claim 10 including means connected to the first and third races to hold them against axial translation, and resilient means connected to the second and fourth races urging them in an axial direction to move said row of balls radially inwardly against the action of centrifugal force on said balls, during rotation of certain of said races.

13. A transmission according to claim 10 including means connected to certain of said races and urging them to move said row of balls radially inwardly against the action of centrifugal force.

14. A transmission according to claim 13 wherein one of said races comprises a driving member, another of said races comprises a driven member, and means to enforce said races and balls to positions for 1:1 drive ratio between said driving and driven members after relative rotation of said driving and driven members through a determinate number of turns.

15. A propeller having a hub and variable pitch blades, a driving ball race driven by and rotatable with the hub and axially movable along the hub, a ball race rotatable relative to the hub and drivingly connected to said blades, two normally non-rotating relatively axially movable races facing the first two races, balls each engaging all said races, the four races comprising a first set of two opposed races of which at least one race is restrained from axial movement, and a second set of two opposed races axially movable relative to the first set, means to shift the relative axial position of said races to alter the drive ratio from the driving to the driven race from 1:1 to underdrive and to overdrive, said balls during rotation with and with respect to said races being urged outwardly under the influence of centrifugal force and tending to shift the drive ratio in one direction, elastic means connected to at least one race of said set of axially movable races urging it in a direction to move the balls inwardly and tending to shift the drive ratio in the other direction, and means to adjust the force exerted by said elastic means.

16. A propeller having a hub and variable pitch blades, a driving ball race driven by and rotatable with the hub and axially movable along the hub, a ball race rotatable relative to the hub and drivingly connected to said blades, two normally non-rotating relatively axially movable races facing the first two races, balls each engaging all said races, the four races comprising a first set of two opposed races of which at least one race is restrained from axial movement, and a second set of two opposed races axially movable relative to the first set, means to shift the relative axial position of said races to alter the drive ratio from the driving to the driven race from 1:1 to underdrive and to overdrive, said balls during rotation with and with respect to said races being urged outwardly under the influence of centrifugal force and tending to shift the drive ratio in one direction, elastic means connected to at least one race of said set of axially movable races urging it in a direction to move the balls inwardly and tending to shift the drive ratio in the other direction, means to adjust the force exerted by said elastic means, and means for limiting the pitch change range of said propeller blades comprising a device on said propeller and a device connected to said axially movable races, said two devices being engageable when the blades reach a desired pitch limit, and said devices when engaged being operative to shift said movable races to a position to establish a 1:1 drive ratio from said driving race to said driven race despite the centrifugal effects on said balls and despite the force of said elastic means.

17. A continuously variable ratio change speed transmission comprising first and second substantially externally conical coaxial races, third and fourth substantially internally conical races coaxial with one another and with the first two races, the race surfaces being disposed relative to one another to define a ball carrying annular cavity, a plurality of balls in the annular cavity each engaged by all of said races, resilient means connecting the first and third races to preload them against said balls, resilient means connecting the second and fourth races to preload them against said balls, means to move the second and fourth races jointly in an axial direction relative to the first and third races, and connections from said different races to a driving element, to a driven element, and to a reaction element.

18. In a variable ratio ball transmission, four races disposed to define an annular space therebetween, a row of balls in said space each ball engaged by all four of said races, the first and third of said races lying opposite and facing one another, said first and third races being so profiled that zones of contact of a ball with the races are substantially at the ends of the same diameter of a ball for the several positions of the ball along the races, the second and fourth of said races lying opposite and facing one another and disposed between said first and third races, said second and fourth races being so profiled that zones of contact of a ball with the second and fourth races are substantially at the ends of the same diameter of a ball for the several positions of the ball along the races, elastic means connecting the first and third races to load them into ball engagement, elastic means connecting the second and fourth races and loading them into ball engagement, means to shift the first and third races axially and jointly with respect to the second and fourth races whereby the row of balls is shifted along the several race faces, and means mounting at least three of said races for rotation relative to each other.

19. A transmission according to claim 18 including means connected to two adjacent races and holding them against rotation, a driving connection to one of the remaining races, and a driven connection to the other remaining race.

20. A transmission according to claim 18 including means connected to the first and third races to hold them against axial translation, and resilient means connected to the second and fourth races urging them in an axial direction to move said row of balls radially inwardly against the action of centrifugal force on said balls, during rotation of certain of said races.

21. A transmission according to claim 18 including means connected to certain of said races and urging them to move said row of balls radially inwardly against the action of centrifugal force.

22. A transmission according to claim 19 wherein one of said races comprises a driving member, another of said races comprises a driven member, and means to enforce said races and balls to positions for 1:1 drive ratio between said driving and driven members after relative rotation of said driving and driven members through a determinate number of turns.

References Cited in the file of this patent

UNITED STATES PATENTS

| Number | Name | Date |
| --- | --- | --- |
| 1,686,446 | Gilman | Oct. 2, 1928 |
| 1,691,625 | Chilton | Nov. 13, 1928 |
| 2,164,489 | Berliner | July 4, 1939 |
| 2,573,258 | Gerritsen | Oct. 30, 1951 |

FOREIGN PATENTS

| Number | Country | Date |
| --- | --- | --- |
| 376,630 | Italy | Nov. 20, 1939 |
| 911,604 | France | Mar. 18, 1946 |